(12) United States Patent
Mihelič

(10) Patent No.: US 7,762,570 B2
(45) Date of Patent: Jul. 27, 2010

(54) SELF-LOCKING MECHANISM

(75) Inventor: Miko Mihelič, Dobrova (SI)

(73) Assignee: Studio Moderna SA, Lugano (CH)

( * ) Notice: Subject to any disclaimer, the term of this patent is extended or adjusted under 35 U.S.C. 154(b) by 205 days.

(21) Appl. No.: 11/398,200

(22) Filed: Apr. 4, 2006

(65) Prior Publication Data
US 2007/0235978 A1    Oct. 11, 2007

(51) Int. Cl.
*B62K 21/00* (2006.01)
(52) U.S. Cl. .................. 280/278; 280/276; 403/325
(58) Field of Classification Search ............... 280/278; 403/325
See application file for complete search history.

(56) References Cited

U.S. PATENT DOCUMENTS

| 3,362,725 | A | | 1/1968 | Dolphin |
| 4,501,340 | A | * | 2/1985 | Yoshida ...................... 180/219 |
| 5,323,664 | A | * | 6/1994 | Fairfield et al. ............ 74/551.3 |
| 5,337,609 | A | * | 8/1994 | Hsu ........................... 74/551.3 |
| 5,440,948 | A | * | 8/1995 | Cheng ........................ 74/551.3 |
| 5,906,452 | A | * | 5/1999 | Lee ............................. 403/325 |
| 6,290,297 | B1 | * | 9/2001 | Yu ........................... 297/378.12 |
| 6,502,675 | B1 | * | 1/2003 | Andrus ........................ 188/344 |
| 7,232,144 | B2 | * | 6/2007 | Colman ....................... 280/287 |
| 7,306,249 | B2 | * | 12/2007 | Kwok et al. ................. 280/278 |

FOREIGN PATENT DOCUMENTS

| DE | 10025923.5 | 11/2001 |
| EP | 0197163 | 10/1986 |

\* cited by examiner

*Primary Examiner*—Lesley Morris
*Assistant Examiner*—Tashiana Adams
(74) *Attorney, Agent, or Firm*—Mitchell P. Brook; Luce, Forward, Hamilton & Scripps LLP

(57) ABSTRACT

A self-locking mechanism includes a first body member that rotates relative to a second body member, a lock lever rotatably coupled to the first body member and a biasing element that biases the rotation of the lock lever in a latching direction. The lock lever includes a cam portion that includes a cam surface configured to interface with a latch element on the second body member. The cam surface slidably engages the latch element and is configured so that the sliding engagement between the cam surface and the latch element causes the body members to be drawn together when the lock lever is rotated in the latching direction.

21 Claims, 15 Drawing Sheets

SELF-LOCKING MECHANISM

FIELD OF THE INVENTION

The present invention is directed to a self-locking mechanism, and more particularly to a self-locking mechanism for positioning two or more moving parts in relative alignment with one another.

BACKGROUND OF THE INVENTION

The technical problem the invention solves is to design an interface between moving parts, such as parts of a folding bicycle or a storage compartment, that automatically and rigidly locks the parts together and may be selectively unlocked without the use of tools.

Various locking mechanisms have been utilized for selectively securing parts. Two known examples are folding bicycles and for airplane stowage bins. For example, U.S. Pat. No. 4,417,745 describes a folding handlebar assembly included in a folding bicycle. The handlebar assembly includes a horizontal tube that is mounted to a steering column post through a transverse mounting tube. The horizontal tube is coupled at each end to a hinge bar and a handle bar portion is slidably attached to each of the hinge bars. In order to place the handle bar portions in an operative position, the handle bar portions are lifted into position and slid over the hinge bars sot that they abut respective ends of the horizontal tube. Pins are then inserted into apertures that extend through the hinge bars and handle bar portions, which prevent subsequent relative motion between the parts.

The assembly suffers from various disadvantages. First, the assembly is not self-locking because it requires manual insertion of the locking pins by the user. Next, it requires the user store the pins when the bicycle is in a folded configuration. Finally, because the locking pins must be closely matched to the size of the apertures, any changes in the dimensions of the apertures or locking pins, such as by normal wear, will cause the assembly to become less rigid.

Another folding handle bar assembly is provided in U.S. Pat. No. 6,301,749 to Chen. That assembly includes a tube, a seat member that is secured to the tube, a pair of hand grips, a clamping bar and a conventional quick release fastener. The seat member and the bar collectively define a channel that is configured to receive an end of each hand grip. The quick release fastener couples the bar to the seat member and allows the user to selectively clamp the hand grips therebetween.

Similar to the previously described locking mechanism, the folding handle bar assembly described in the Chen patent is not self locking and conventional quick release fasteners are notorious for being used improperly. As a result, it requires the user to properly adjust the fastener to achieve a proper clamping force.

An example of a latch assembly used in an airplane stowage bin is shown in U.S. Pat. No. 4,637,642 to Stoecker. That device includes a pivotally mounted latching arm that is moved by a sliding actuating member both of which are attached to a hinged stowage bin door. The actuating member is spring-loaded so that it is forced to abut a portion latching arm which forces latching arm into a latching position. The latching arm includes a generally hook-shaped end that is configured to hook over a striker that is provided on a stationary portion of the stowage bin. The hook-shaped end includes a contact surface that is generally planar and oriented so that a line extending normal to the surface passes above the axis of rotation of the latch arm.

Although the mechanism is designed to be self-locking, the latching arm is specifically designed so that the hinged bin door and the stationary portion are not drawn together. In fact, the latching arm is specifically configured so that stowage bin door can be pushed toward the stationary portion during unlatching. As a result, the mechanism is designed so that there is play between the bin door and stationary portion.

It is desired to provide a self-locking mechanism that provides a rigid interface between two parts that are configured to rotate relative to each other that does not require user adjustment and will not loosen after a period of usage.

SUMMARY OF THE INVENTION

The present invention alleviates to a great extent the disadvantages of known self-locking mechanisms for positioning parts in relative alignment with one another. In one aspect of the invention a self-locking mechanism is provided that provides a relatively fixed interface between two parts configured to rotate relative to one another. In another aspect of the invention a self-locking mechanism is provided that does not require a user to adjust the locking mechanism to create a proper fit. In another aspect of the invention, a self-locking mechanism is provided that is relatively unsusceptible to loosening due to normal wear of the parts.

The self-locking mechanism, or latch assembly, of the present invention includes a first body member that is hinged so that it rotates relative to a second body member, and a lock lever. The lock lever is rotatably coupled to one of the body members and includes a cam portion, which may be generally hook-shaped or wedge-shaped, and a handle portion. In addition, a biasing element rotationally biases lock lever to rotate in a latching direction. The cam portion further includes a cam surface that is configured to interface with a latch element on the other body member. The cam surface is configured to slidably engage the latch element so that as the lock lever is rotated under the influence of the biasing element the body members are drawn closer together.

In embodiments employing a hook-shaped cam portion, the cam surface is configured so that a distance between a center of rotation of the lock lever and a tip of the hook-shaped cam portion is larger than the distance between the center of rotation of the lock lever and a location on the cam surface. In embodiments employing a wedge-shaped cam portion, the cam surface is configured so that a distance between a center of rotation of the lock lever and an apex of the cam portion is smaller than a distance between the center of rotation of the lock lever and a location on the cam surface.

The biasing element is selected to provide sufficient force to rotate lock lever in the latching direction when the cam surface is in sliding contact with the latch feature so that the body members are drawn sufficiently together to provide a rigid interface without the user being required to manipulate the lock lever. The user may unlock the mechanism by pulling or pressing the handle portion of the lock lever to overcome the torque provided by the biasing element and the friction between the cam surface and the latch element.

BRIEF DESCRIPTION OF THE FIGURES

Exemplary embodiments of the invention will be explained in detail with reference to the following figures in which like reference numerals refer to like parts throughout.

DETAILED DESCRIPTION OF THE INVENTION

In the following paragraphs, the present invention will be described in detail by way of example with reference to the drawings. Throughout this description, the preferred embodiment and examples shown should be considered as exemplar, rather than as limitations on the present invention. As used herein, the "present invention" refers to any one of the embodiments of the invention described herein, and any equivalents. Furthermore, reference to various feature(s) of the present invention throughout this document does not mean that all claimed embodiments must include the referenced feature(s).

Figure 1:
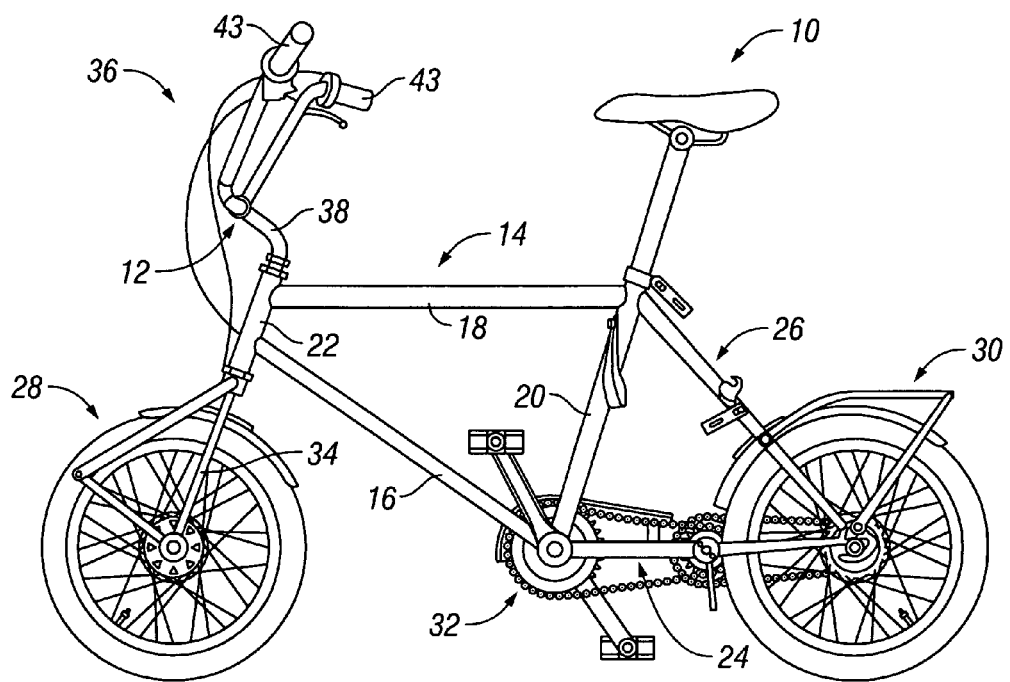
FIG. 1 is a side view of a folding bicycle in a riding mode that includes a self-locking mechanism in accordance with the present invention.

Referring to FIG. 1, one embodiment of a foldable bicycle 10 including a self-locking mechanism 12 of the present invention is illustrated. Bicycle 10 includes a frame assembly 14 that is constructed with a down tube 16, a top tube 18, a seat tube 20, a headset tube 22, a pair of chain stays 24 and a pair of seat stays 26. A front wheel assembly 28 and a rear wheel assembly 30 are coupled to frame assembly 14. A drive train assembly 32 is also coupled to frame assembly 14 and rear wheel assembly 30 and is used to transmit power supplied from a rider during pedaling to rear wheel assembly 30.

Front wheel assembly 28 is rotatably coupled to headset tube 22 of frame assembly 14 so that bicycle 10 may be steered. In particular, front wheel assembly 28 is coupled to a fork 34 which extends through headset tube 22 and is coupled to a neck 38, also commonly referred to as a "goose neck." Neck 38 is coupled to a handle bar assembly 36. Fork 34 and neck 38 sandwich a headset bearing assembly (not shown) within headset tube 22 which allows handle bar assembly 36, neck 38, fork 34 and front wheel assembly 28 to be rotated in unison relative to frame assembly 14. Handle bar assembly 36 is provided to allow the user to steer bicycle 10 by manipulating the angle of front wheel assembly 28 with respect to frame assembly 14, as is well known in the art.

Referring to FIGS. 1, 2, 3A and 3B, handle bar assembly 36 will be described. Handle bar assembly 36 includes a crossbar 40, which is coupled to neck 38. Each end of crossbar 40 is coupled to a respective handle bar 42 through a corresponding self-locking mechanism 12. Self-locking mechanisms 12 allow handle bars 42 to be selectively positioned in either a folded position or a riding position with respect to crossbar 40. In the folded position, handle bars are folded down to reduce the overall size of the bicycle. In the riding position, handle bars 42 extend generally upward from crossbar 40 which orients associated grip portions 43 horizontally so a user may easily grasp them.

Figure 2:
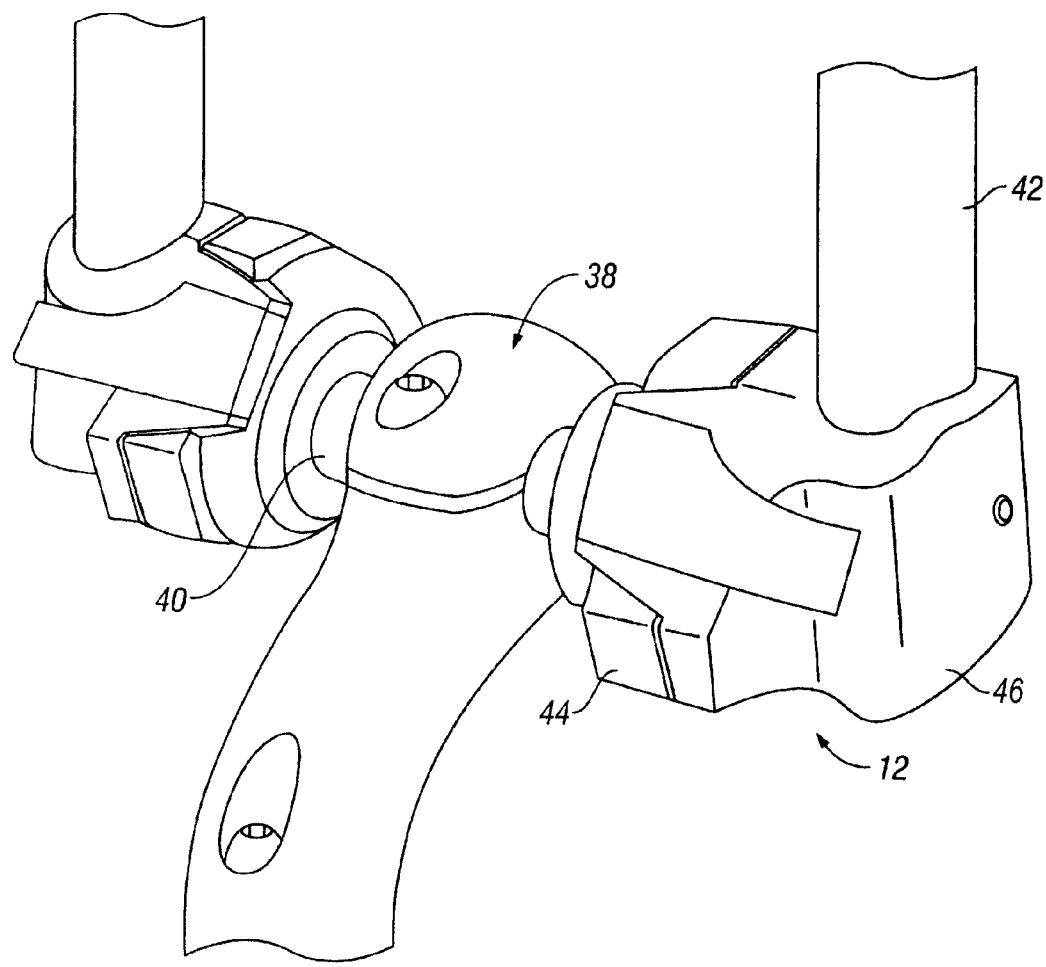
FIG. 2 is a perspective view of a portion of the folding bicycle including a self-locking mechanism in accordance with the present invention.

Self-locking mechanism 12 is selectively transformed into an opened and unlocked position when it is desired to fold handle bars 42 down. Alternatively, self-locking mechanism may be transformed into a closed and locked position, as shown in FIG. 2, when a user desires to ride bicycle 10.

Each self-locking mechanism 12 generally includes a stationary body member 44, a folding body member 46 and a lock lever 48. In the present embodiment, stationary body member 44 is hinged directly to folding body member 46 so that the two body portions are capable of folding relative to each other about a hinge axis A. The two body members fold so that an interface surface 45 of stationary body member 44 may selectively rotate towards an interface surface 47 of folding body member 46, such as when self-locking mechanism 12 is placed in a closed position. As will be described in greater detail below, lock lever 48 is rotatably coupled to one body member and is configured to interact with a portion of the other body member to rigidly hold stationary body member 44 in fixed relation to folding body member 46. In the present embodiment, lock lever 48 is supported by folding body member 46 and is configured to interface with a portion of stationary body member 44 to rigidly lock the body members together.

Stationary body member 44 includes a bore that is sized to slidably receive an end of crossbar 40. Body member 44 and crossbar 40 are rigidly coupled, for example by one or more fasteners extending through an aperture 52 that extends radially through body member 44 and a matching aperture 53 that extends radially through crossbar 40. Preferably, the apertures are sized and oriented so that a fastener is press fit into them. It shall be appreciated that the term "fastener" is intended to include pins, such as a dowel pins or spring pins, screws, rivets and any other mechanical fastener known in the art. Furthermore, body member 44 may be permanently affixed to crossbar 40, such as by welding or brazing, or it may be machined as an integral part of crossbar 40.

A slot 54 extends through an outer portion of body member 44 that is spaced away from the hinged interface with body member 46. In the present embodiment, slot 54 is located at a position on body member 44 that is diametrically opposed to the hinged interface. As will be apparent from further description below, slot 54 is sized to receive lock lever 48. In addition, slot 54 includes angled side walls 55 that are angled with respect to a longitudinal axis of self-locking mechanism 12 by an angle α, as shown in FIG. 3B.

A latch element, latch pin 56 in the present embodiment, extends across slot 54 and is oriented generally parallel to hinge axis A. Latch pin 56 is a dowel pin that is press fit into apertures that extend into the side walls of slot 54. Latch pin 56 maybe any material known in the art, but is preferably constructed from hardened steel, stainless steel or titanium. However, it shall be appreciated that any latching element may be substituted for or used in addition to latch pin 56 such as a shoulder, web or tab that extends across at least a portion of slot 54 and is configured to interface with lock lever 48.

As described above, stationary body member 44 and folding body member 46 are coupled so that they are able to rotate relative to each other about hinge axis A. In the present embodiment, folding body member 46 includes a hinge tab 58 that is received in a corresponding hinge slot 59 included in body member 44. Hinge tab 58 and the hinge slot 59 include aligned apertures 60 that are configured to receive a hinge pin 62 so that at least one of body members 44,46 is able to rotate about pin 62 and hinge axis A which extends through and is parallel to pin 62.

A handlebar interface portion 76 of folding body member 46 supports handle bar 42. Handlebar interface portion 76 includes an arcuate surface 77 that defines semi-circular channel configured to receive a lower portion of handle bar 42. Handle bar 42 is rigidly coupled to folding body member 46 with fasteners that may be extended through aperture 78 of body portion 46 and into aperture 79 of handle bar 42. It should be appreciated that handle bar interface portion 76 may be oriented to hold handle bar 42 at any angle with respect to hinge axis A. It should further be appreciated that although surface 77 is shown as semi-circular, it may have any shape desired. For example, surface 77 may have any number of facets to correspond to a faceted handle bar 42.

In addition, lock lever 48 is rotatably coupled to a support portion 64 of folding body member 46 about a lock axis B. Lock axis B is oriented so that it is generally parallel to hinge axis A. As mentioned above, second body portion 46 includes a lock lever supporting portion 64. Supporting portion 64 is spaced from hinge tab 58 and includes a pair of arms 65 that project from interface surface 47 toward stationary body member 44. An outer surface 66 of each arm 65 is angled with respect to a longitudinal axis of self-locking mechanism 12 by an angle α, as shown in FIG. 3B, which is preferably approximately 3°. An aperture 68 extends through each of arms 65. Apertures 68 are aligned on axis B and configured to receive a pin 69 that extends through an aperture 70 of lock lever 48 to rotatably support lock lever 48 between arms 65.

Pin 69 also extends through springs 72, or other biasing elements, which are interposed between lock lever 48 and arms 65. Each spring 72 is configured to interface arm 65 and lock lever 48 and to cause lock lever 48 to be biased to rotate with respect to body portion 46 in a predetermined latching direction. The "latching direction" is the direction of rotation of lock lever 48 that tends to tighten a cam surface 82 of lock lever 48 against latch pin 56 and is dependent on the design of the lock lever as will be described in further detail below. The spring constant of the biasing elements is selected so that the biasing elements alone create sufficient force between latch pin 56 and lock lever 48 to rigidly close and lock self-locking mechanism 12 as will be described in greater detail below.

Figure 3A:
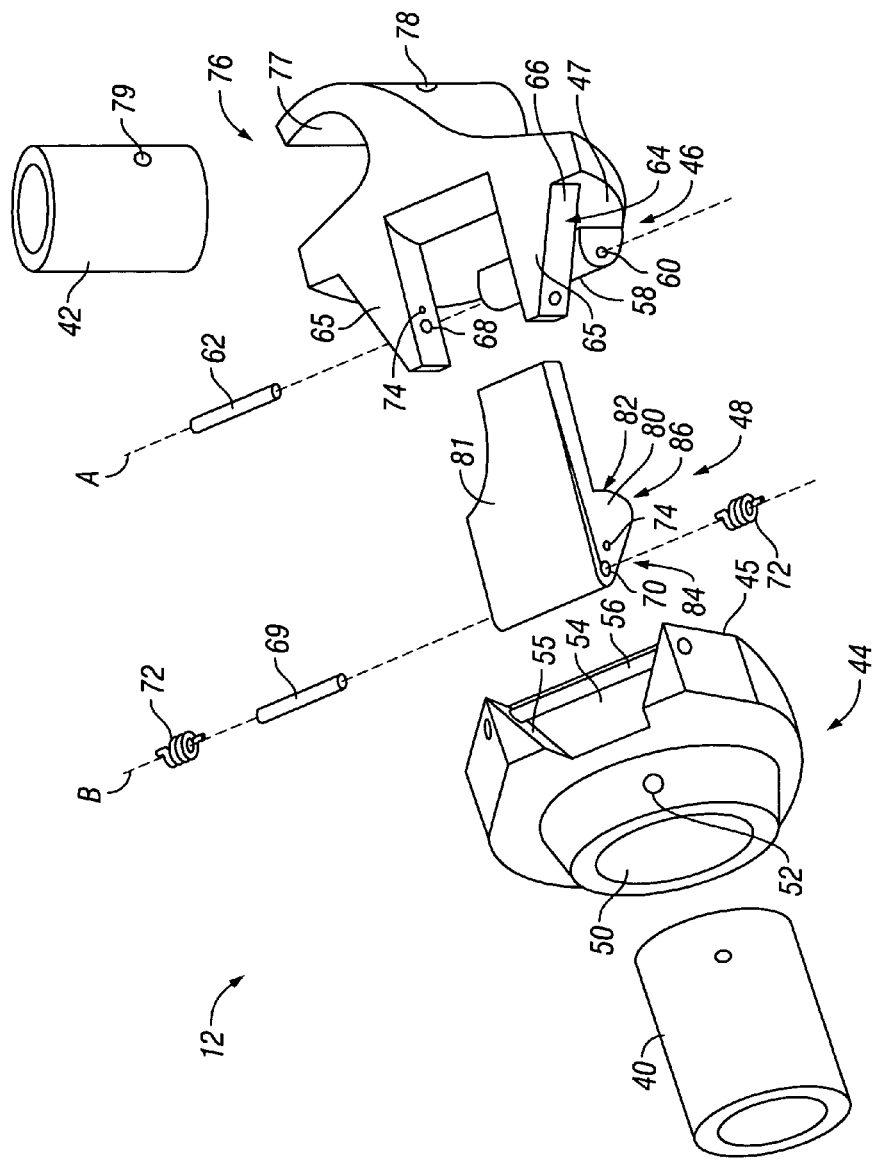
FIGS. 3A and 3B are an exploded view and a top partially assembled view, respectively, of an embodiment of a self-locking mechanism.
Figure 3B:
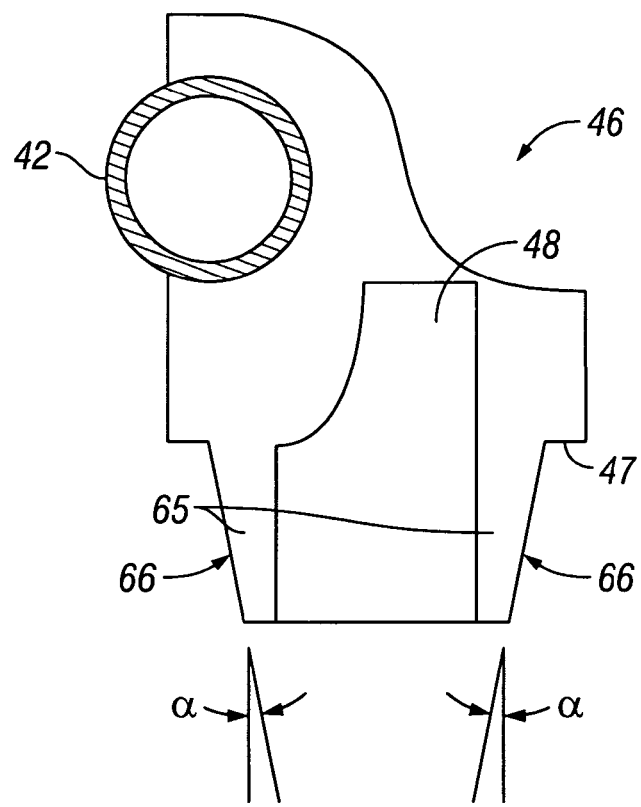

As shown in FIG. 3A, springs 72 are straight offset helical torsion springs that have tabs 73 configured to be received in respective apertures 74 included in arms 65 and lock lever 48. It should be appreciated that spring 72 may be any device configured to bias the rotation of lock member 48 in the latching direction and any number of devices may be used. For example, in the present embodiment two springs 72 are provided and located so that one interfaces with each arm 65 between lock lever 48 and the respective arm 65. For example, a single helical spring may be interposed between lock lever 48 and folding body member 46 to provide an axial force that biases lock lever 48 to rotate in the latching direction.

Figure 3B:
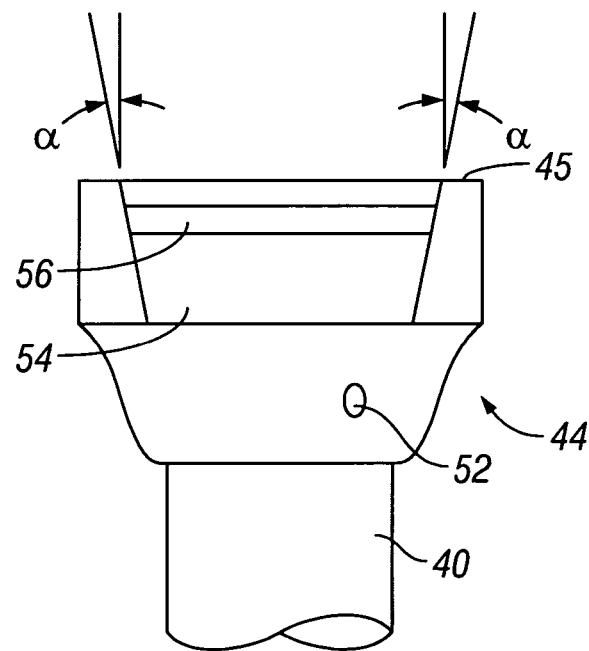
Figure 4:
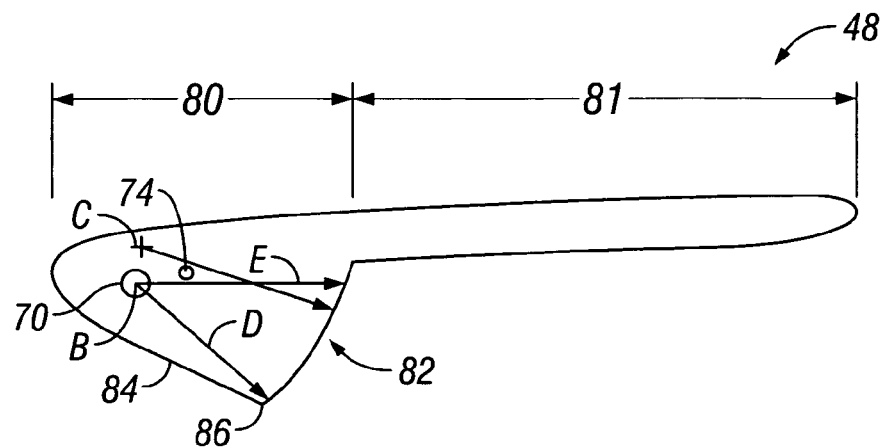
FIG. 4 is a side view of a lock lever included in the self-locking mechanism of FIG. 3.

Referring to FIGS. 3 and 4, lock lever 48 includes a cam portion 80 and a handle portion 81. Cam portion 80 has a generally wedge-shaped cross-section and includes an arcuate cam surface 82 that abuts latch pin 56 when self-locking mechanism 12 is in a closed and locked position, an outer surface 84 that contacts latch pin 56 when self-locking mechanism 12 is being closed, and an apex 86 where cam surface 82 meets outer surface 84.

Cam surface 82 is configured so that the center of curvature C of cam surface 82 is not aligned with the center of rotation (i.e., lock axis B) of lock lever 48 so that cam surface 82 may be pressed against latch pin 56 by rotating lock lever 48. In particular, in the present embodiment, the distance between the center of rotation and a first location on cam surface 82 adjacent apex 86 (i.e., distance D) is smaller than the distance between the center of rotation and a second location on cam surface 82 spaced away from apex 86 (i.e., distance E). The difference in those distances assures that the self-locking mechanism remains rigid when it is closed and locked due to the biasing force placed on the lock lever in the latching direction by the biasing elements.

Handle portion 81 extends away from cam portion 80 and provides a grasping surface that a user can grip, or press, to unlock self-locking mechanism 12. The length of handle portion 81 is chosen so that the user may easily overcome the combined torque produced by the biasing elements and friction between cam surface 82 and latch pin 56 and rotate lock lever 48 in an unlocking direction. It shall be appreciated that "unlocking direction" refers to the direction of rotation that is opposite to the latching direction. As will also be described in greater detail below, rotation of lock lever 48 in the unlocking direction creates clearance between cam portion 80 and latch pin 56 which permits folding body member 46 to be folded away from stationary body member 44, thereby permitting self-locking mechanism 12 to be opened.

Referring to FIGS. 5-8, operation of self-locking mechanism 12 is described. Self-locking mechanism 12 is illustrated in an opened and unlocked position in FIG. 5. In that position, folding body member 46 is rotated away from stationary body member 44 about hinge pin 62 and hinge axis A so that interface surface 45 is spaced from and angled with respect to interface surface 47. In addition, cam surface 82 of lock lever 48 is completely disengaged from latch pin 56 and lock lever 48 is rotated in the latched direction by the biasing force of the biasing elements. Contact between handle portion 81 and a portion of rotating body member 46 limits the rotation of lock lever 48 in the latching direction, which is clockwise as shown in FIGS. 5-8.

Figure 6:
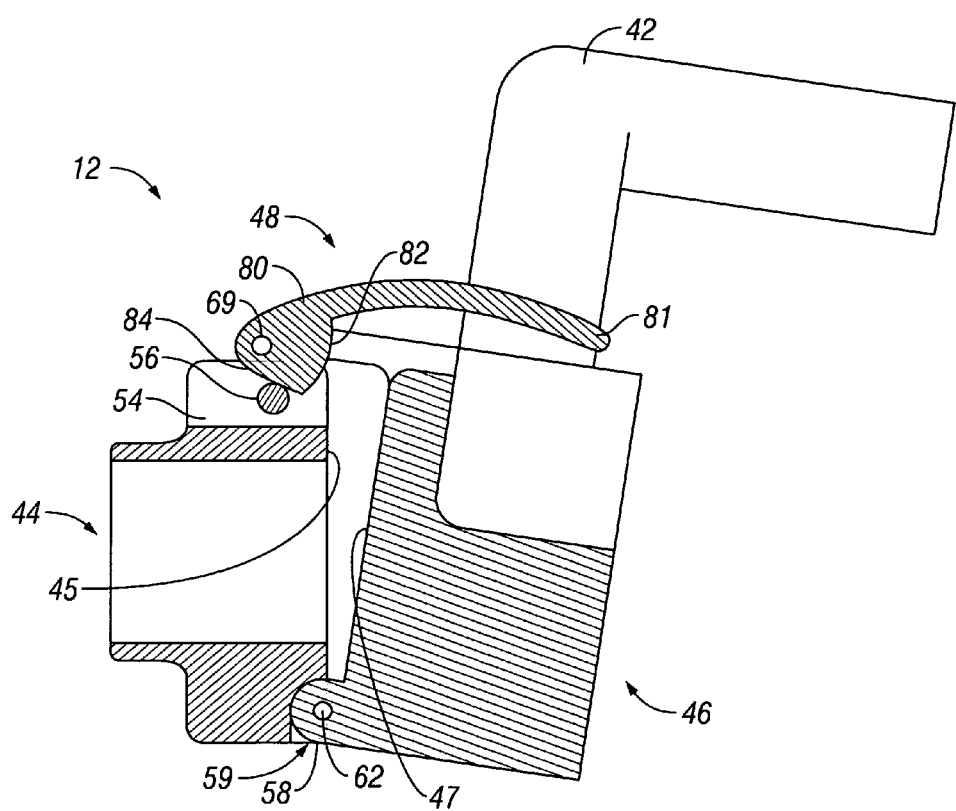
FIG. 6 is a cross-sectional view of the self-locking mechanism of FIG. 3 in an intermediate position.

In FIG. 6, self-locking mechanism is shown in an intermediate position which corresponds to a position that self-locking mechanism 12 would be placed in while being closed. Self-locking mechanism 12 is placed in the intermediate position by rotating folding body member 46 toward stationary body member 44. As folding body member 46 is moved closer to stationary body member 44, cam portion 80 of lock lever 48 is moved into receiving slot 54 and outer surface 84 of cam portion 80 slides against latch pin 56. The contact between outer surface 84 and latch pin 56 forces lock lever 48 to rotate in the unlocking direction (i.e., counterclockwise as shown). Cam portion 80 is dimensioned so that it is able to pass over the top of lock pin 56 as folding body member 46 is rotated toward stationary body member 44 so upon further rotation of folding body member 46 latch pin 56 slides past apex 86 and onto cam surface 82.

After latch pin 56 passes apex 86, the direction of rotation of lock lever 48 changes to the latching direction under the influence of the biasing force created by the biasing elements. As the biasing force causes lock lever 48 to rotate in the latching direction, the sliding contact between latch pin 56 and cam surface 82 causes interface surface 47 of folding body member 46 to be drawn towards interface surface 45 of stationary body member 44. In particular, because distance E of cam portion 80 is greater than distance D, cam portion 80 forces the center of rotation of lock lever 48 away from latch pin 56 as lock lever 48 is rotated in the latching direction, which forces side walls 66 of arms 65 to abut side walls 55 of slot 54 thereby placing interface surface 47 parallel to and spaced from interface surface 45. The space between interface surface 47 and interface surface 45 is preferably 1-3 mm. The space between interface surface 47 and interface surface 45 allows self-locking mechanism to maintain a rigid interface between stationary body portion 44 and folding body portion 46 regardless of whether the abutting surfaces wear with use. However, it should be appreciated that stationary body portion 44 and folding body portion 46 may be configured so that interface surface 47 and interface surface 45 abut when self-locking mechanism is in a closed position.

Figure 7:
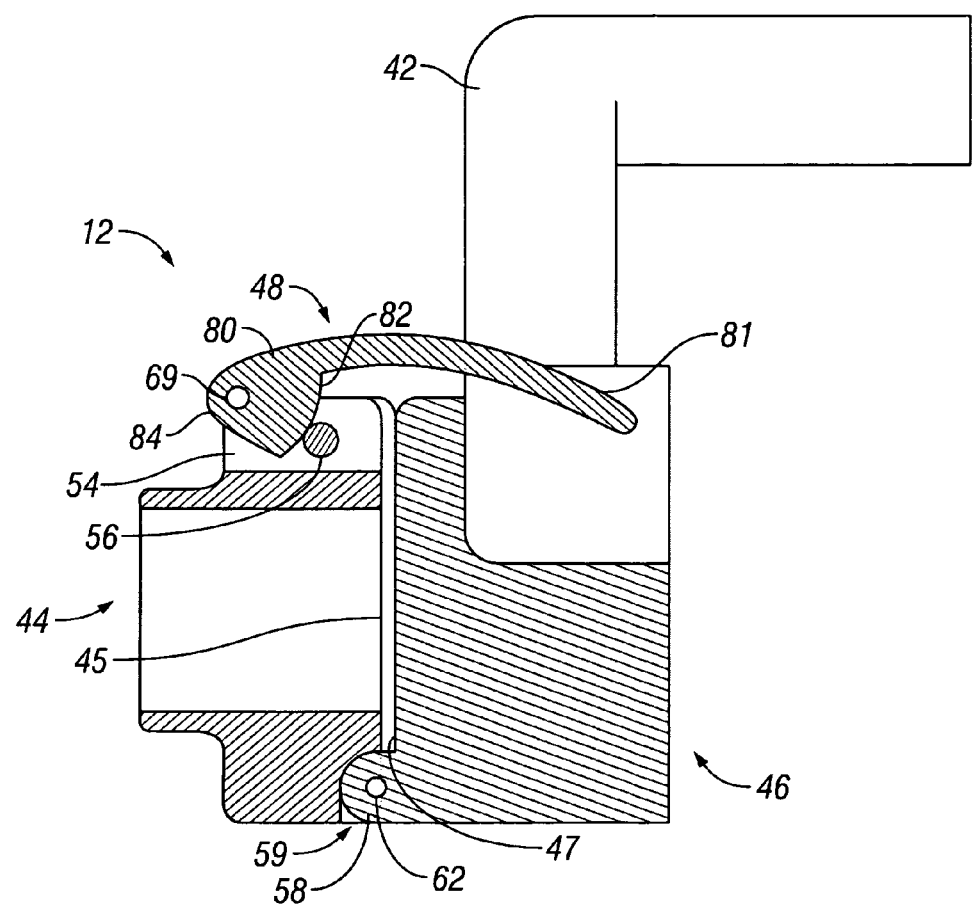
FIG. 7 is a cross-sectional view of the self-locking mechanism of FIG. 3 in a closed and locked position.
Figure 8:
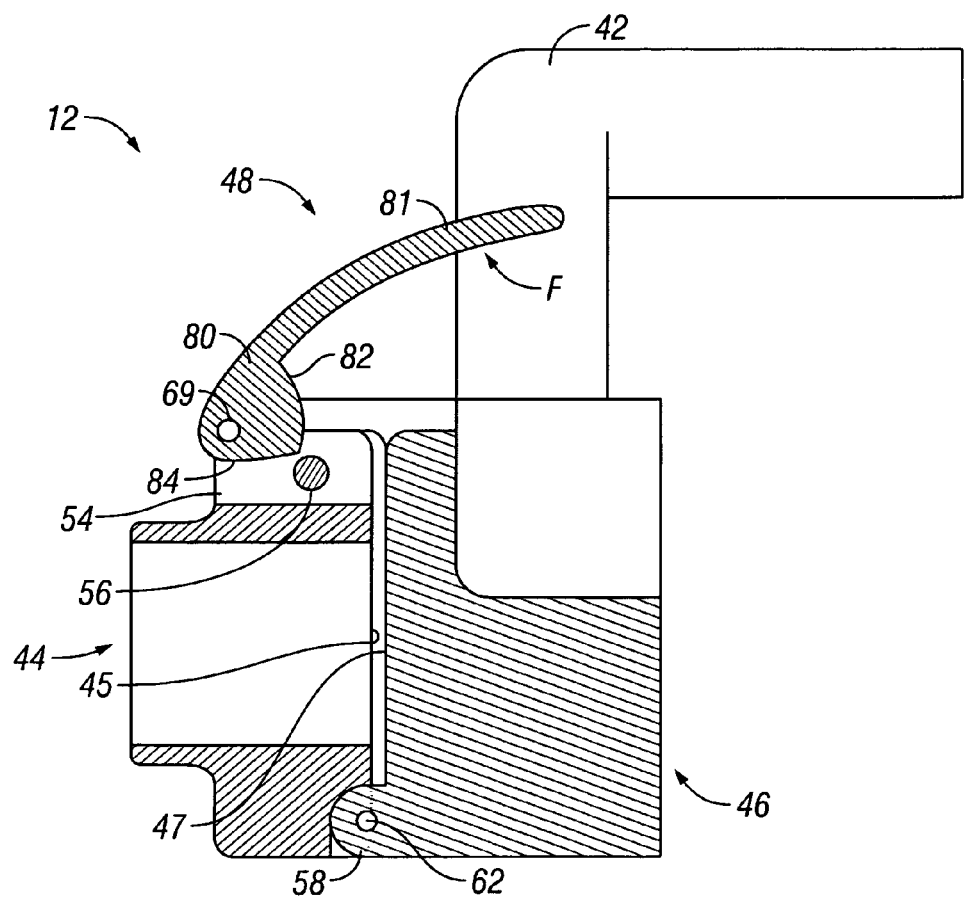
FIG. 8 is a cross-sectional view of the self-locking mechanism of FIG. 3 in a closed and unlocked position.

The closed and locked position of self-locking mechanism is shown in FIG. 7. In that position, side wall 66 is held tightly against side wall 55 so that there is no relative movement between the surfaces. Preferably, the parts are dimensioned so that prior to experiencing wear, latch pin 56 contacts an intermediate position on cam surface 82 when self-locking mechanism 12 is closed and locked. If the parts experience wear, the location of contact between latch pin 56 and cam surface 82 may move further away from apex 86 but the force generated between latch pin 56 and cam surface 82 will still be sufficient to maintain the rigidity of self-locking mechanism 12 in the closed and locked position.

The biasing elements are selected so that during operation a user is not required to manipulate lock lever 48 to close and lock self-locking mechanism 12. Therefore, the user is only required to rotate handle bar 42 into the correct orientation with respect to crossbar 40 and the mechanism will properly lock. As a result, self-locking mechanism 12 is less susceptible to failure due to improper use. In addition, the self-locking mechanism is configured so that if a user does manipulate lock lever 48 the mechanism will properly lock after the user releases lock lever 48.

When a user desires to unlock self-locking mechanism 12, they lift handle portion 81 in the direction shown by arrow F so that lock lever 48 rotates in the unlocking direction. Rotating lock lever 48 in that direction creates clearance between cam portion 80 and latch pin 56 so that folding body member 46 to be rotated away from stationary body member 44. As mentioned above, the length of handle portion 81 is selected so that the user may easily overcome the combination of torque created by biasing elements and friction between latch pin 56 and cam surface 82 and rotate lock lever 48. Preferably, the user is required to apply minimal lifting force to unlock self-locking mechanism 12 so that the device may be used by any user.

Figure 10:
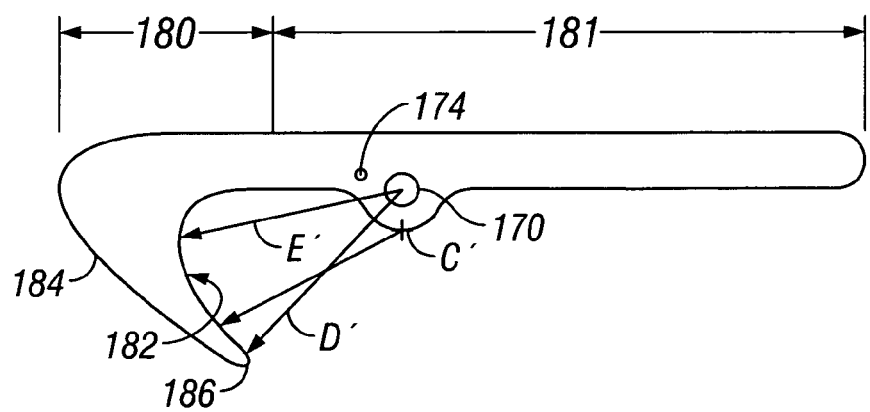
FIG. 10 is a cross-sectional view of the self-locking mechanism shown in FIG. 9 in a closed and unlocked position.
Figure 5:
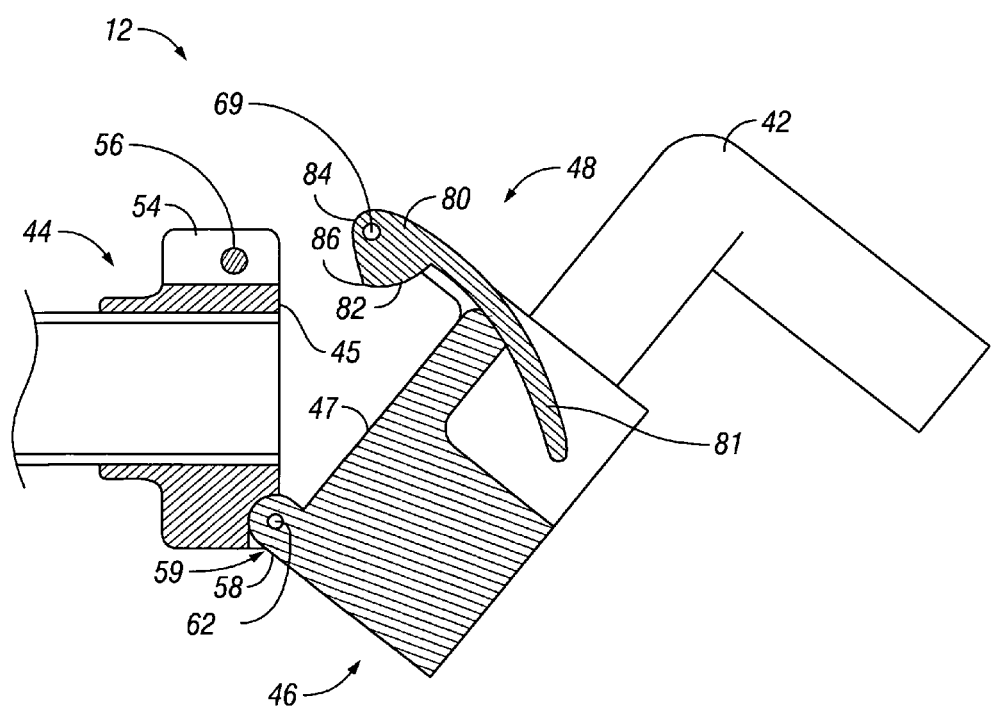
FIG. 5 is a cross-sectional view of the self-locking mechanism of FIG. 3 in an opened and unlocked position.
Figure 9:
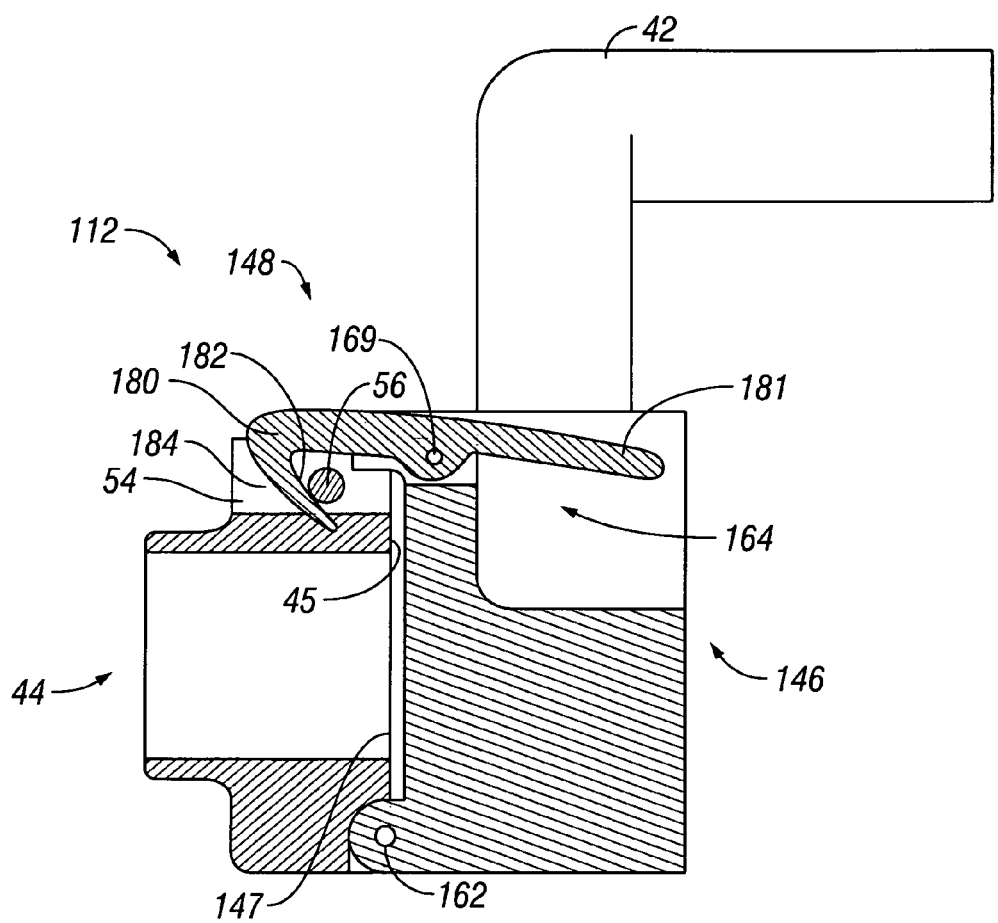
FIG. 9 is a cross-sectional view of another embodiment of a self-locking mechanism, shown in a closed and locked position.

A second embodiment of the self-locking mechanism is shown in FIGS. 9 and 10. Self-locking mechanism 112 generally includes a stationary body member 44 that is hinged with a second body member 146 so that they are configured to move relative to one another and a lock lever 148. In the present embodiment, lock lever 148 includes a hook-shaped cam portion 180 and folding body member 146 is configured to support lock lever 148 accordingly. It shall be appreciated that stationary body member 44 includes the same features described above with respect to the previous embodiment and like reference numbers are intended to refer to similar or identical features in the present embodiment.

Similar to the previous embodiment, folding body member 146 includes a handlebar interface portion that receives a lower portion of handle bar 42 which is rigidly coupled to folding body member 146. Lock lever supporting portion 164 rotatably supports lock lever 148 by a lock lever pin 169 that extends through lock lever 148 and into supporting portion 164. Although support arms may not be required in such an embodiment, arms having angled outer side walls may be included to abut angled side walls of slot 54.

Lock lever 148 includes a hook-shaped cam portion 180 and a handle portion 181, as shown in FIG. 10. Cam portion 180 includes an arcuate cam surface 182 that is configured to abut lock pin 56 of body portion 44 when self-locking mechanism 112 is in a closed and locked position, as shown in FIG. 9. Cam surface 182 is configured so that the center of curvature C' of cam surface 182 is not aligned with the center of rotation of lock lever 148 so that cam surface 182 may be pressed against latch pin 56 by rotating lock lever 148. In particular, in the present embodiment, the distance between the center of rotation of lock lever 148 and a first location on cam surface 182 adjacent an apex 186 (i.e., distance D') is larger than the distance between the center of rotation and a second location on cam surface 182 spaced away from apex 186 (i.e., distance E'). The difference in those distances assures that the self-locking mechanism remains rigid when it is closed and locked due to a biasing force placed on lock lever 148 in the latching direction by biasing elements. In the present embodiment, the latching direction corresponds to counterclockwise rotation of lock lever 148 in the configuration shown in FIGS. 9 and 10.

In the present embodiment, the hook-shaped cam portion 180 allows cam surface 182 and handle portion 181 to be located on opposite sides of the center of rotation of lock lever 148. As a result, the lock lever support portion of folding body member 146 does not require arms to support lock lever 148, but arms may be provided to abut a portion of slot 54.

Self-locking mechanism 112 is closed and locked by rotating folding body member 146 toward stationary body member 44 about a hinge pin 162. As folding body member 146 is rotated toward body portion 44, an outer surface 184 of cam portion 180 slides against latch pin 56 and forces lock lever 148 to rotate in the unlock direction until apex 186 passes over latch pin 56. After apex 186 slides over latch pin 56, the biasing force created by the biasing elements forces lock lever 148 to rotate in the latching direction and cam surface slides against latch pin 56.

Because distance E' of lock lever 148 is less than distance D', as latch pin 56 slides against cam surface 182 and away from apex 186 the distance between latch pin 56 and the center of rotation of lock lever 148 is reduced. As a result, stationary body member 44 and folding body member 146 are drawn together so that interface surface 45 of stationary body member 44 is rigidly held parallel to and spaced from an interface surface 147 of folding body member 146. Similar to the previous embodiment, latch pin 56 is preferably located at an intermediate location along cam surface 182 when self-locking mechanism 112 is closed and locked, as shown in FIG. 9.

Figure 11:
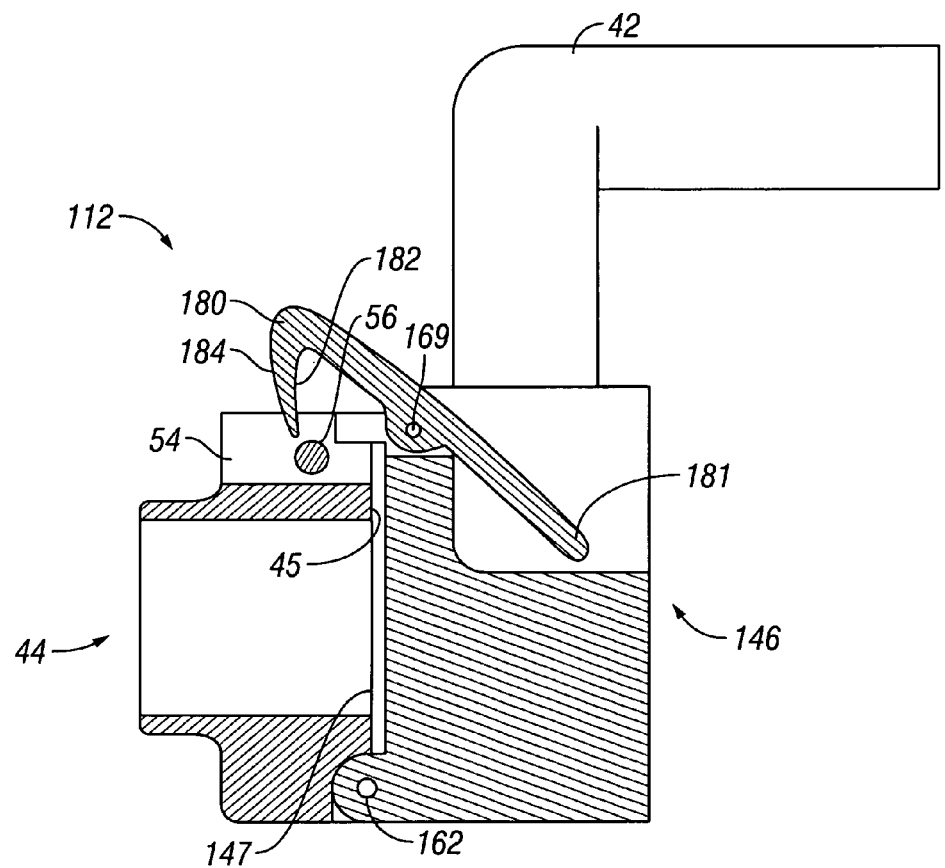
FIG. 11 is a side view of a lock lever included in the self-locking mechanism of FIG. 9.

Handle portion 181 extends away from cam portion 180 and provides a grasping surface that a user can press to unlock self-locking mechanism 112. The length of handle portion 181 is chosen so that the user may easily overcome the torque produced by the biasing members and the friction created between cam surface 182 and latch pin 56 to rotate lock lever 148. Lock lever 148 is rotated to create clearance between cam portion 180 and latch pin 56 to allow folding body member 146 to be rotated away from stationary body member 44, thereby unlocking self-locking mechanism 112 and permitting it to be opened, as shown in FIG. 11.

Figure 12:
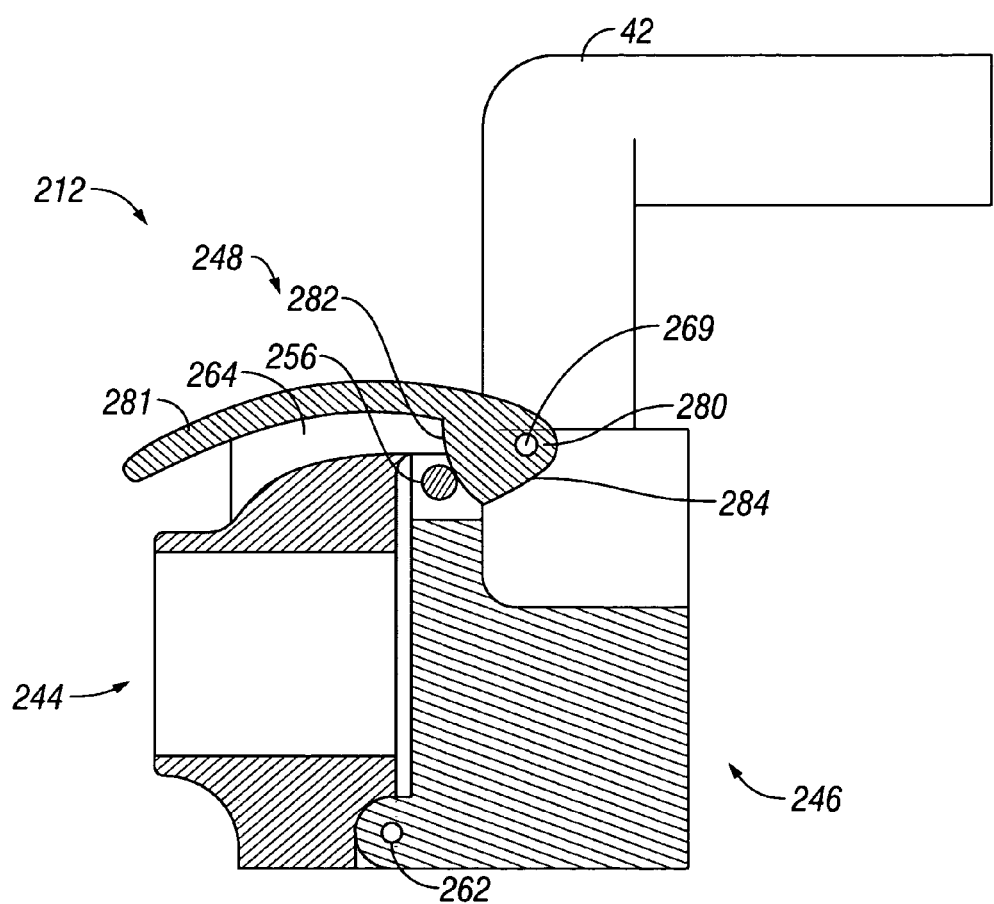
FIG. 12 is a cross-sectional view of another embodiment of a self-locking mechanism, shown in a closed and locked position, in accordance with the present invention.
Figure 13:
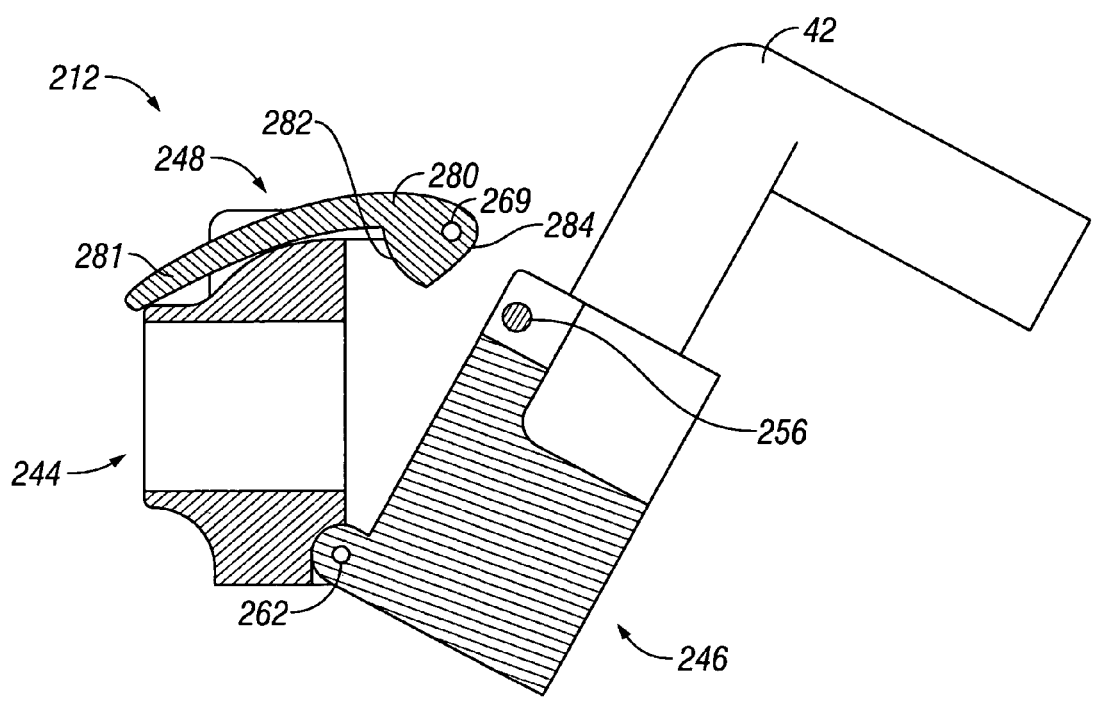
FIG. 13 is a cross-sectional view of the self-locking mechanism of FIG. 12 in an opened and unlocked position.

Referring to FIGS. 12 and 13, another embodiment of the self-locking mechanism will be described. Self-locking mechanism 212 generally includes a stationary body member 244 hinged to a folding body portion 246 and a lock lever 248. Similar to the embodiment shown in FIGS. 1-8, lock lever 248 includes a wedge-shaped cam portion 280 and operates in a similar fashion. However, in the present embodiment lock lever 248 is coupled to a support portion 264 that is a part of stationary body member 244 and a latch pin 256 is included on folding body member 246. In addition, bias elements are included bias rotation of lock lever 248 in the latching direction, which is counterclockwise in the configuration shown.

Operation of self-locking mechanism 212 is similar to the embodiments described above. In particular, in order to close and lock self-locking mechanism 212, folding body member 246 is rotated toward stationary body member 244 about hinge pin 262. During that rotation, an outer surface 284 of lock lever 248 slides against latch pin 256, which causes lock lever 248 to rotate clockwise with respect to the remainder of stationary body member 244. After an apex 286 of cam portion 280 passes over latch pin 256, lock lever 248 rotates in the latching direction under the influence of the biasing elements and latch pin 256 slides against a cam surface 282 of cam portion 280.

Cam surface 280 is configured so that the center of rotation of lock lever 248 is not coincident with the center of curvature of cam surface 282. That configuration results in the interaction between latch pin 256 and cam surface 282 causing folding body member 246 to be drawn toward stationary body member 244 as lock lever 248 rotates in the latching direction.

Unlocking self-locking mechanism 212 requires a user to lift handle portion 281 of lock lever 248, thereby rotating lock lever 248 clockwise. Clockwise rotation of lock lever 248 creates clearance between cam portion 280 and latch pin 256, which allows self-locking mechanism 212 to be opened. As shown in FIG. 13, after self-locking mechanism 212 is opened and handle portion 281 is released, the rotational bias of lock lever 248 causes it to rotate to a counterclockwise position with respect to stationary body member 244.

Figure 14:
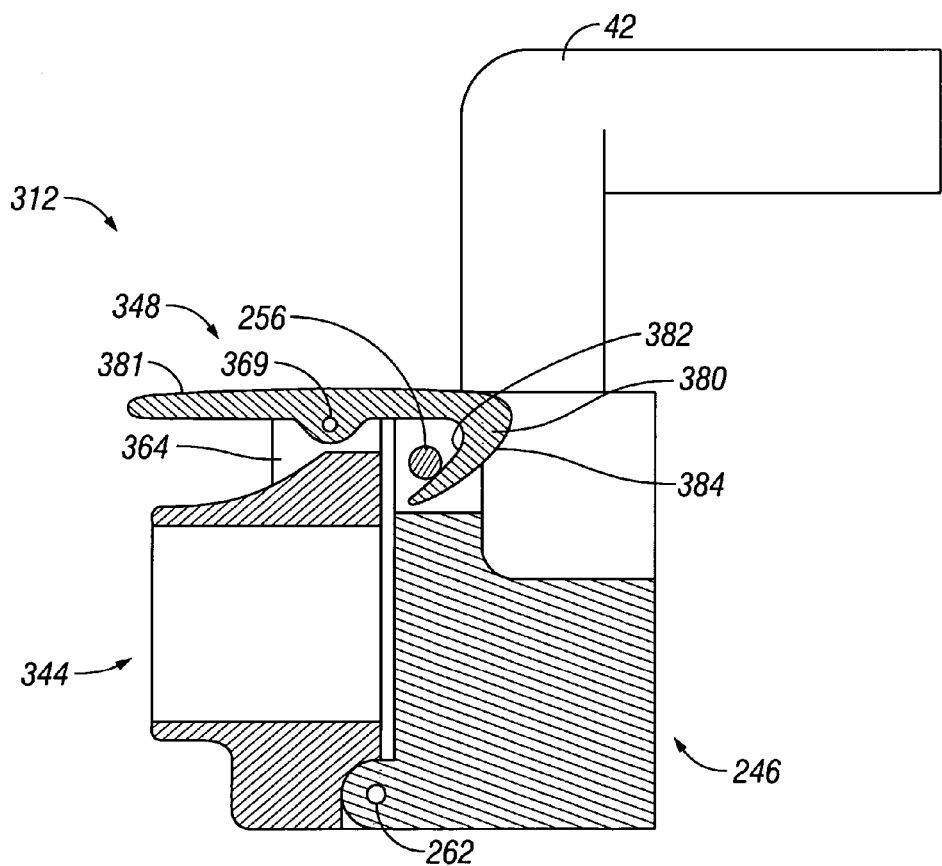
FIG. 14 is a cross-sectional view of another embodiment of a self-locking mechanism, shown in a closed and locked position, in accordance with the present invention.
Figure 15:
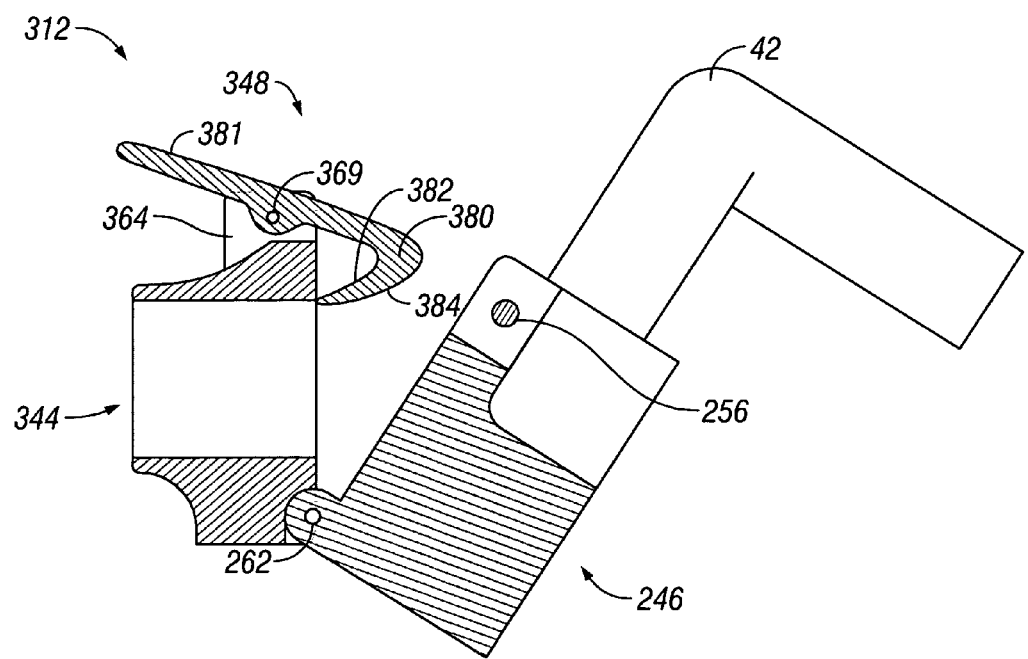
FIG. 15 is a cross-sectional view of the self-locking mechanism of FIG. 14 in an open and unlocked position.

Referring to FIGS. 14 and 15, another embodiment of the self-locking mechanism will be described. Self-locking mechanism 312 includes a stationary body member 344 hinged to a folding body member 246 and a lock lever 348. Similar to the embodiment shown in FIGS. 9-11, lock lever 348 includes a hook-shaped cam portion 380 and operates in a similar fashion. It shall be appreciated that folding body member 246 includes the same features described above with respect to the embodiment shown in FIGS. 12 and 13 and like reference numbers are intended to refer to similar or identical features in the present embodiment.

In the present embodiment lock lever 348 is coupled to a support portion 364 that is a part of stationary body member 344 and latch pin 256 is included on folding body member 246. In addition, biasing elements are included to rotationally bias lock lever 348 in the latching direction, which is clockwise in the configuration shown.

Operation of self-locking mechanism 312 is similar to the embodiments described above. In particular, in order to close and lock self-locking mechanism 312, folding body member 246 is rotated toward stationary body member 344 about hinge pin 262. During that rotation, an outer surface 384 of lock lever 348 slides against latch pin 256, which causes lock lever 348 to rotate counterclockwise with respect to the remainder of stationary body member 344. Eventually, an apex 386 of lock lever 348 slides past latch pin 256 and lock lever is able to rotate in the latching direction with latch pin sliding against cam surface 382 until pressure between latch pin 256 and cam surface 382 is sufficient to stop rotation of lock lever 348 and to hold stationary body member 344 and folding body member 246 together.

Cam portion 380 is also configured so that the center of rotation of lock lever 348 is not coincident with the center of curvature of cam surface 382. As described above with respect to the previous embodiment, that configuration results in the sliding interaction between lock pin 256 and cam surface 382 causing body portion 344 and body portion 246 to be drawn together.

Unlocking self-mechanism 312 requires a user to press handle portion 381 of lock lever 348 to rotate it counterclockwise. That rotation of lock lever 348 creates clearance between cam portion 380 and latch pin 256 which allows self-locking mechanism 312 to be opened. The biasing force created by the biasing elements causes lock lever 348 to rotate in the latching direction so that when self-locking mechanism 312 is opened, lock lever 348 is rotated to a clockwise position as shown in FIG. 15.

It shall be appreciated that despite the embodiments being described with reference to "stationary" and "folding" members, one or both of the members may be moving and the terms are not intended to be limiting.

In addition, it should be appreciated that although a self-locking mechanism is described with respect to a handlebar assembly for a folding bicycle, the self-locking mechanism is suitable for use in many applications. For example, the self-locking mechanism may be used in folding bicycles, luggage, storage compartments or bins, folding ladders, or any other device that has components that fold relative to each other and would benefit from having a self-locking mechanism to prevent relative motion and to avoid the shortcomings of previously known devices.

It should further be appreciated that the latch element need not be oriented parallel to the hinge axis of the self-locking mechanism and that the axis of rotation of the lock lever need not be parallel to either the hinge axis or the latch element.

What is claimed is:

1. A self-locking mechanism coupling a first body member to a second body member, comprising:
   a latch element mounted to one of the first body member or second body member and a lock lever rotatably coupled to the other of the first body member or second body member about a lock axis, wherein the second body member is hinged with respect to the first body member along a hinge axis such that it is rotatable between an opened position and a closed position;
   the lock lever including a leading latch element engagement surface; and
   a biasing element coupled to the lock lever and positioned along the lock axis.

2. The self-locking mechanism according to claim 1, wherein the latch element is an elongate structure that is oriented substantially parallel to the hinge axis.

3. The self-locking mechanism according to claim 1, wherein the latch element is a pin coupled to the second body member.

4. A self-locking handle bar assembly of a bicycle, comprising:
   a crossbar configured to be secured to a neck portion of the bicycle;
   a handle bar; and
   a self-locking mechanism including:
      a first body member fixedly coupled to an end of the crossbar;
      a second body member that is hinged with the first body member and coupled to the handle bar;

a latch element mounted to the first body member and a lock lever rotatably coupled to the second body member about a lock axis;

the lock lever including a leading latch element engagement surface; and a biasing element coupled to the lock lever and positioned along the lock axis.

5. The self-locking handle bar assembly according to claim 4, wherein the latch element is a pin coupled to the first body member and the lock lever is coupled to the second body member.

6. The self-locking handle bar assembly according to claim 4, wherein the latch element is a pin coupled to the second body member and the lock lever is coupled to the first body member.

7. A self-locking mechanism, comprising:

a first body member including a first interface surface;

a second body member hinged relative to the first body member and including a second interface surface, wherein the second body member is configured to be rotated between an open position in which the first interface surface is spaced from the second interface surface and a closed position in which the first interface surface abuts the second interface surface;

a lock lever rotatably coupled to the second body member about a lock axis and including a cam portion and a handle portion extending from the cam portion, the cam portion including a cam surface; and a biasing element disposed parallel to the lock axis.

8. The self-locking mechanism according to claim 7, wherein the cam portion is substantially wedge-shaped and a center of curvature of the cam surface is spaced from a center of rotation of the lock lever such that a distance between a center of rotation of the lock lever and an apex of the wedge-shaped cam portion is smaller than a distance between the center of rotation of the lock lever and a location on the cam surface.

9. The self-locking mechanism according to claim 7, wherein the portion of the first body member that the cam surface is configured to engage is a pin coupled to the first body member.

10. The self-locking mechanism according to claim 9, wherein the pin is spaced from the hinged connection between the first body portion and the second body portion.

11. The self-locking mechanism according to claim 1, further including a locking surface, the locking surface engaging the latch element when the lock lever is moved in the locking direction and the first body member and the second body member are in the closed position.

12. The self-locking mechanism according to claim 11, wherein the locking surface includes an arcuate cam surface.

13. The self-locking mechanism according to claim 12 wherein the cam surface is included on a hook-shaped cam portion of the lock lever, and a center of curvature of the cam surface is spaced from a center of rotation of the lock lever such that a distance between the center of rotation of the lock lever and the tip of the hook-shaped cam portion is larger than a distance between the center of rotation of the lock lever and a location on the cam surface.

14. The self-locking mechanism according to claim 13, wherein a center of rotation of the lock lever is located between the cam portion and a handle portion of the lock lever.

15. The self-locking mechanism according to claim 12, wherein a center of curvature of the cam surface is spaced from a center of rotation of the lock lever such that a distance between the center of rotation of the lock lever and an apex of the cam portion is smaller than a distance between the center of rotation of the lock lever and a location on the cam surface.

16. The self-locking mechanism according to claim 12, wherein a center of rotation of the lock lever is located in the cam portion of the lock lever.

17. The self-locking mechanism of claim 1 wherein the first body member defines a slot having at least one side wall.

18. The self-locking mechanism of claim 17 wherein the second body member comprises a lock lever supporting portion including a pair of arms that project toward the first body member, each arm having at least one side wall;

wherein the side walls of the pair of arms of the second body member abut the at least one side wall of the first body member.

19. The self-locking mechanism of claim 1 wherein the biasing element is located along the lock axis.

20. The self-locking mechanism of claim 4 wherein the biasing element is located along the lock axis.

21. The self-locking mechanism of claim 7 wherein the biasing element is located along the lock axis.

* * * * *